(12) United States Patent
Caceres et al.

(10) Patent No.: US 8,588,990 B2
(45) Date of Patent: Nov. 19, 2013

(54) COMMUNICATING THROUGH A SERVER BETWEEN APPLIANCES AND APPLICATIONS

(75) Inventors: Adrian Caceres, Los Gatos, CA (US); David R. Friedman, Menlo Park, CA (US)

(73) Assignee: Ayla Networks, Inc., Sunnyvale, CA (US)

( * ) Notice: Subject to any disclaimer, the term of this patent is extended or adjusted under 35 U.S.C. 154(b) by 312 days.

(21) Appl. No.: 13/173,038

(22) Filed: Jun. 30, 2011

(65) Prior Publication Data

US 2013/0006400 A1   Jan. 3, 2013

(51) Int. Cl.
*G06F 19/00* (2011.01)
(52) U.S. Cl.
USPC ........................................ 700/295; 700/300
(58) Field of Classification Search
USPC .................................. 700/295, 300
See application file for complete search history.

(56) References Cited

U.S. PATENT DOCUMENTS

| | | | |
|---|---|---|---|
| 7,088,238 B2 | 8/2006 | Karaoguz et al. | |
| 7,256,704 B2 | 8/2007 | Yoon et al. | |
| 7,787,490 B2 * | 8/2010 | Azevedo et al. | 370/465 |
| 8,280,009 B2 * | 10/2012 | Stepanian | 379/1.01 |
| 2009/0083060 A1 | 3/2009 | Sherman et al. | |
| 2010/0217550 A1 | 8/2010 | Crabtree et al. | |
| 2010/0217642 A1 | 8/2010 | Crubtree et al. | |
| 2010/0241699 A1 | 9/2010 | Muthukumarasamy et al. | |
| 2010/0332617 A1 * | 12/2010 | Goodwin et al. | 709/219 |
| 2011/0252420 A1 * | 10/2011 | Tung et al. | 718/1 |
| 2012/0109384 A1 * | 5/2012 | Stepanian | 700/275 |

OTHER PUBLICATIONS

LG Debuts New Home Appliances with Latest Smart Features, Images, Jan. 5, 2011, Core Technologies at CES 2011, 4 pages, Las Vegas, Nevada, www.lg.com.
LG Debuts New Home Appliances with Latest Smart Features, Jan. 5, 2011, Core Technologies at CES 2011, 4 pages, Las Vegas, Nevada, www.lg.com.
LG Home Network Technologies, Jan. 5, 2011, LG Electronics USA, 2 pages. 2011, www.lg.com.

* cited by examiner

*Primary Examiner* — Kidest Bahta
(74) *Attorney, Agent, or Firm* — The Mueller Law Office, P.C.

(57) ABSTRACT

A method and apparatus for communicating between electrical appliances (e.g. smoke detectors, thermostats, refrigerators, TV program recorders, lawn/garden sprinkler systems, irrigation control systems, etc.) and cloud-based applications (e.g. Facebook, Twitter, MySpace, email, SMS, etc.) includes a server that translates communications between the communication protocols used by the appliances and applications. The electrical appliances include a minimum complexity necessary to perform their primary functions and to communicate with the server. Additional complexity necessary for the electrical appliances to communicate with the cloud-based applications is enabled by the server remote from the electrical appliances.

21 Claims, 6 Drawing Sheets ated into the electrical appliances. To enable these capabilities, such feature-rich electrical appliances must have relatively large microprocessors with sufficient memory resources to host the various required software and networking services.
COMMUNICATING THROUGH A SERVER BETWEEN APPLIANCES AND APPLICATIONS

BACKGROUND OF THE INVENTION

Many home or office electrical appliances or embedded devices (e.g. thermostats, refrigerators, ovens, alarms, etc.) could be enhanced by a connection to the Internet through which these appliances could be updated, monitored and/or controlled remotely. It has been suggested that such remote access could occur through existing Internet or World Wide Web (WWW) services, such as email, SMS (Short Message Service), Facebook, Twitter, etc. For the electrical appliances to communicate through these services, the various protocols used by these services must be programmed into the electrical appliances. To enable these capabilities, such feature-rich electrical appliances must have relatively large microprocessors with sufficient memory resources to host the various required software and networking services.

Many of these types of electrical appliances have already been developed with microprocessors, memory and other components for controlling the general functions of these appliances without the addition of any networking or external communication capability. These components have, thus, become common core components of such appliances. These components, however, are relatively small and under-powered for the more resource-intensive activities required to adequately handle the types of Internet and WWW services that the appliance manufacturers expect their customers to want in network-capable electrical appliances. It is necessary, therefore, for the appliance manufacturers to undertake a significant redesign of the core components of their electrical appliances in order to add the networking or external communication capability. There is, thus, a trend to increase the internal complexity (greater feature-richness) of many types of electrical appliances. Such increased complexity and redesign efforts often delay the introduction of a new product into the market. Additionally, both the redesign work and the larger more powerful components generally increase the overall cost and size of the electrical appliances, which consumers often prefer to be relatively small and cheap.

Furthermore, since new Internet and WWW services are occasionally developed, customers will expect their existing network-capable appliances to be able to work with the new services, even though the new services may not have even existed when the customers bought the various appliances. Network-capable appliances, therefore, must also have an upgrading or updating capability by which new protocols for the new Internet and WWW services can be added to the appliances after the appliances have been sold into the market and installed in customers' homes or offices. Such upgradability adds an additional layer of complexity and cost to the electrical appliances.

Additionally, a significant degree of uncertainty accompanies such capabilities, since the appliance manufacturers cannot reasonably anticipate all of the new Internet and WWW services that could come into existence after the appliances have entered the marketplace. It is necessary, therefore, for the manufacturers to overdesign the appliances in order to ensure that the appliances can be fully upgraded to the satisfaction of their customers for the reasonably expected lifetime of the product. Otherwise, the appliances will have limited flexibility to support new protocols emerging on the Internet or WWW.

BRIEF SUMMARY OF THE INVENTION

The present invention enables apparently-feature-rich electrical appliances, embedded devices and/or a server to provide a flexible path for connectivity to Internet or WWW services through existing and emerging (future) communication protocols.

Various embodiments of the present invention generally include electrical appliances (or embedded devices), a server or both to mitigate or eliminate some or all of the above described problems (among others). In contrast to the existing trend to increase the complexity of electrical appliances to be able to communicate with many Web-based applications, the electrical appliances generally communicate only with the server. The server remotely enables the capability to communicate with various Internet or WWW or "cloud" based services or applications en masse.

Since the electrical appliances preferably communicate only with the server, the electrical appliances generally have a relatively minimum degree of complexity necessary to transmit and receive communications in whatever protocol is used between the electrical appliances and the server. When the electrical appliances need to communicate with or through any Internet or WWW or cloud-based services, the server translates the communications between the protocol used by the electrical appliances and the various communication protocols used by the Internet or WWW or cloud-based services.

Since the electrical appliances communicate in such a limited number of protocols (e.g. only one or two), the electrical appliances do not require relatively large or numerous or expensive components, as described above for the prior art feature-rich electrical appliances. Instead, the electrical appliances can generally make do with smaller cheaper microprocessors, memory and other components. (In some embodiments, the electrical appliances can use the relatively small microprocessors used by the prior art electrical appliances that do not have networking or external communication capabilities.) A communication module and an API (application programming interface for the existing microprocessor to operate the communication module) are, thus, the only components that need to be added to such electrical appliances to enable features of the present invention for some embodiments.

The extra complexity needed for the electrical appliances to communicate with the various current and future Internet or WWW or cloud-based services and applications is enabled by the server remote from the electrical appliances. In some embodiments, the electrical appliances do not even need to have any internal means to determine the services and applications with which they communicate. All such controls and settings are preferably managed within the server. Additionally, the ability to upgrade the appliances to be able to communicate with later-introduced applications is preferably handled entirely within the server, so nothing needs to be added to the appliances to enable such upgrades. Therefore, in some embodiments, the appliances can be designed for only a minimal upgrades, e.g. to fix bugs in the API or the communication module.

Server technologies generally enable a high degree of flexibility, scalability, upgradeability and security with an economy of scale unmatchable by having such capabilities or features built in to the electrical appliances. Such issues are, thus, of almost negligible significance or importance in some embodiments of the present invention.

A more complete appreciation of the present disclosure and its scope, and the manner in which it achieves the above noted improvements, can be obtained by reference to the following detailed description of presently preferred embodi-

DETAILED DESCRIPTION OF THE INVENTION

Figure 1:
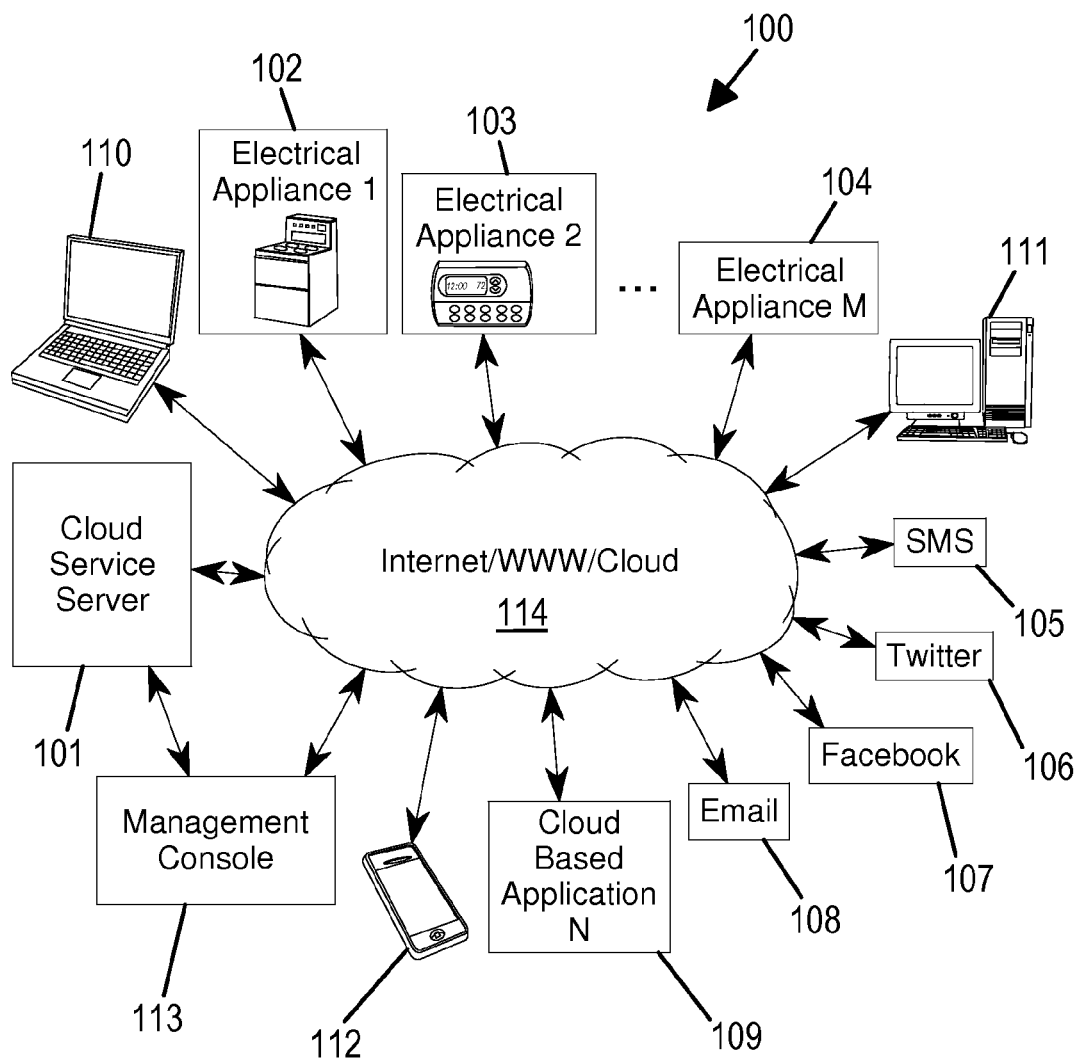
FIG. 1 is a simplified diagram of an example communication system for communicating between electrical appliances (or embedded devices) and Internet, WWW or cloud-based services (or applications), according to an embodiment of the present invention.

A communication system 100 incorporating an embodiment of the present invention is shown in FIG. 1. The communication system 100 generally includes a cloud service server (the server) 101, a variety of electrical appliances 102, 103 and 104, a variety of Internet, WWW or cloud-based services (the cloud-based applications) 105, 106, 107, 108 and 109, a variety of electronic devices 110, 111 and 112 and a management console 113. The components 101-113 generally communicate through the Internet, the World Wide Web (WWW) or a network "cloud" (the cloud) 114, except where it is appropriate or more convenient to use another communication technique as described herein.

The Internet is generally a global data communications system. It is a hardware and software infrastructure that provides connectivity between computers. In contrast, the Web is generally one of the services communicated via the Internet. It is generally a collection of interconnected documents and other resources, linked by hyperlinks and URLs. In many technical illustrations when the precise location or interrelation of Internet resources is not important, extended networks such as the Internet are often depicted as a cloud (e.g. 114 in FIG. 1). The verbal image has been formalized in the newer concept of cloud computing. The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web and cloud computing are not exactly the same, these terms are generally used interchangeably herein, and they are referred to collectively as the cloud 114.

The electrical appliances 102-104 may be any appropriate devices, such as smoke detectors, thermostats (e.g. 103), refrigerators, TV program recorders, lawn/garden sprinkler systems, irrigation control systems, ovens or stoves (e.g. 102), water heaters, clocks and many others. Such devices generally have relatively little computing resources in them. Thus, they are typically very resource-constrained devices. In some cases, they are referred to as embedded devices, since they include a sort of computer system embedded in a device that includes other components for performing specific or dedicated primary functions of the device. Herein, these devices are referred to collectively as the electrical appliances 102-104.

The cloud-based applications 105-109 are generally any appropriate services or applications that are accessible through any part of the cloud 114. Some examples of such applications include Facebook (e.g. 107), Twitter (e.g. 106), MySpace, email (e.g. 108), Short Message Service (e.g. SMS 105) and many others.

The electronic devices 110-112 are generally any appropriate devices that have access to the cloud 114, such as personal computers (workstation, desktop, laptop, tablet, iPad, e.g. 110 and 111), cell phones (e.g. 112), Kindles, Blackberrys, iPhones, iPods, other PDAs (personal digital assistants), game consoles and many others. These devices 110-112 are preferably feature-rich with respect to communication capabilities, i.e. have built in capabilities to access the cloud 114 and almost any of the cloud-based applications 105-109 or can be loaded with, or programmed to have, such capabilities. The electronic devices 110-112 generally preferably access any part of the cloud 114 through industry standard wired or wireless access points, cell phone cells or network nodes. In some embodiments, users preferably register to use the communication system 100 through their electronic devices 110-112 in order to access their electrical appliances 102-104.

The server 101 is generally any appropriate computer or bank of computers operating server programs that enable access via the cloud 114 to data and applications stored or running therein. The server 101 generally implements the features that enable the electrical appliances 102-104 to communicate with the cloud-based applications 105-109 as described herein. All communications from the electrical appliances 102-104 are directed to the server 101. All communications from the cloud-based applications 105-109, even though these communications typically indicate one of the electrical appliances 102-104 as an intended recipient, are also directed to the server 101.

Depending on the embodiment, users, owners or managers (collectively "users") of the electrical appliances 102-104 generally include homeowners (and some renters) and businesses (and some owners, managers or employees thereof) that have the electrical appliances 102-104 in their homes, offices or any other appropriate facilities. Additionally, in some embodiments, users may also include the designers or manufacturers or sellers of the electrical appliances 102-104. The users access the electrical appliances 102-104 either directly at the electrical appliances 102-104 (e.g. with a user interface panel or keypad) or with their electronic devices 110-112 through the cloud-based applications 105-109 and through the server 101.

Regardless of how a user accesses the electrical appliances 102-104, in various embodiments, some of the functions of the server 101 are generally invisible to the user. In some such embodiments, therefore, the user may get the impression that the electrical appliances 102-104 are feature-rich. In other words, the electrical appliances 102-104 may appear to have a level of complexity of functionality greater than is actually built in to the electrical appliances 102-104 (i.e. they appear able to perform functions that they are not in fact capable of), such as communicating directly with the cloud-based applications 105-109 through the cloud 114. From another point of view, due to functionality of the electronic devices 110-112 in conjunction with functionality enabled by the server 101 remote from the electrical appliances 102-104, the electronic devices 110-112 may present an appearance to the users of communicating directly with, or directly accessing, the electrical appliances 102-104 through the cloud-based applications 105-109.

The overall apparent complexity of features of the electrical appliances 102-104 is generally similar to or even better than that of the prior art feature-rich electrical appliances. However, the electrical appliances 102-104 are significantly simpler and cheaper than the prior art feature-rich electrical appliances, while much of the complexity of features are basically offloaded to the server 101.

In various preferred embodiments, the server 101 communicates with the electrical appliances 102-104 in just one dedicated specific communication protocol. This limitation ensures that the electrical appliances 102-104 have a minimum level of complexity and cost. In some other embodiments, however, the server 101 and the electrical appliances 102-104 may use more than one communication protocol, generally depending on the needs of the manufacturers of the electrical appliances 102-104, but still preferably as few communication protocols as possible. Additionally, in order to maintain the simplicity and hold down the cost of the electrical appliances 102-104 in most embodiments (in contrast to the prior art trend of increasing complexity), it is preferable for each electrical appliance 102-104 to use only one communication protocol, regardless of the number of protocols the server 101 uses to communicate with the various types of electrical appliances 102-104. Furthermore, in some embodiments, although the electrical appliances 102-104 use only a single protocol to transmit to the server 101 the application data that is intended for the cloud-based applications 105-109, the electrical appliances 102-104 may user other communication protocols to transmit other types of data, such as data for authentication or registration of the electrical appliances 102-104.

Each cloud-based application 105-109 generally uses a different communication protocol. The server 101 is capable of communicating in any of the communication protocols used by the cloud-based applications 105-109. The server 101, thus, translates communications between the protocols used by the cloud-based applications 105-109 and the protocol used by the electrical appliances 102-104 whenever any of the electrical appliances 102-104 needs to communicate with any of the cloud-based applications 105-109, and vice versa. Therefore, it is generally unnecessary for the electrical appliances 102-104 to have the ability to generate communications in any of the various protocols used by the cloud-based applications 105-109.

To enable the protocol translation feature of the server 101, the server 101 maintains rules, settings or configuration data (collectively "rules") for each of the electrical appliances 102-104. Whenever the server 101 receives a communication from an electrical appliance 102-104, the server 101 looks up the corresponding rules for that electrical appliance 102-104 to determine how to handle the received communication. The rules for the sending electrical appliance 102-104, for instance, may indicate one (or more) of the cloud-based applications 105-109 (and one or more end users/customers/clients of the cloud-based applications 105-109) that is supposed to receive any status updates or other types of communications from that electrical appliance 102-104. The server 101 then translates the communication into the appropriate protocol and transmits the translated communication to the correct (target) cloud-based application(s) 105-109. Therefore, not only is it generally unnecessary for the electrical appliances 102-104 to have the ability to generate communications in any of the various protocols used by the cloud-based applications 105-109, but it is also unnecessary for the electrical appliances 102-104 to store (or include in outgoing communications) any information that identifies the target cloud-based applications 105-109 (or target users thereof), according to preferred embodiments. In other words, the electrical appliances 102-104 are generally "application agnostic", i.e. have no knowledge of the cloud-based applications 105-109.

On the other hand, communications from the cloud-based applications 105-109 generally need to identify the target electrical appliance 102-104. After all, each of the various cloud-based applications 105-109 may routinely communicate with many different electrical appliances 102-104, and the server 101 needs to have a way to determine the intended recipient of each communication from the cloud-based applications 105-109. Consequently, the cloud-based applications 105-109 (or the electronic devices 110-112, depending on the embodiment) preferably maintain some sort of identifier for the electrical appliances 102-104 with which they communicate. When the server 101 receives a communication from one of the cloud-based applications 105-109, therefore, the server 101 parses the received communication to determine the intended recipient electrical appliance 102-105. Additionally, the server 101 also preferably looks up the rules for the intended recipient electrical appliance 102-105 to determine whether the sending cloud-based application 105-109 (or the originating electronic device 110-112, depending on the embodiment) is authorized to communicate with the intended recipient electrical appliance 102-105.

Additionally, when a new cloud-based application is developed and introduced, the server 101 is preferably upgraded to be able to receive communications in a new communication protocol for the new cloud-based application and to translate communications between the new protocol and the protocol used by the electrical appliances 102-104. The flexibility, scalability and upgradeability of current server technology renders the task of adding new cloud-based application protocols to the server 101 relatively quick and easy, especially compared to the prior art task of upgrading each of the prior art feature-rich electrical appliances to be able to communicate directly with new cloud-based applications.

Although, according to preferred embodiments, the electrical appliances 102-104 communicate directly only with the server 101, some embodiments may allow the communication protocol of the electrical appliances 102-104 to be the same as a communication protocol used by one of the cloud-based applications 105-109 or to be a communication protocol useable by one or more types of the electronic devices 110-112. This situation may especially arise if the protocol used by the electrical appliances 102-104 is a widely available industry standard communication protocol. Therefore, some embodiments may allow the electrical appliances 102-104 to communicate directly with some of the electronic devices 110-112 or one of the cloud-based applications 105-109 in addition to communicating with or through the server 101. According to some preferred embodiments, the electrical appliances 102-104 are preferably preconfigured at time of manufacture with a communication address (e.g. a URL, an IP address, etc.) for communicating with the server 101 and may or may not have the ability to upgrade or change or add to the preconfigured communication address. Including the ability to add to or change the target communication address would only slightly (almost insignificantly) increase the complexity and cost of the electrical appliances 102-104.

The management console 113, according to some embodiments, is generally a Web-based application through which a user may control or manage the server 101. Additionally, the management console 113 may be separate from or integrated into the functions of the server 101. Furthermore, the management console 113 may communicate with the server 101 through the cloud 114 or through a point-to-point connection, a LAN, a WAN or any other appropriate communication technique. Also, different versions of the management console 113 may be accessible depending on the type of the electronic device 110-112 used to access it, e.g. different versions of the management console 113 may be written specifically for mobile or non-mobile devices, devices with or without keyboards/pads, devices using different operating systems or Web browsers, etc.

In some embodiments, a new or current user generally browses to a Web site (or set of Web sites or pages) to access the management console 113. In some embodiments, a new user preferably registers, or creates a user account, upon initially accessing the management console 113. After registering, the user preferably identifies one or more of the user's electrical appliances 102-104, e.g. by entering one or more unique ID numbers or key codes for the user's electrical appliances 102-104. The user can then enter commands, make selections or configure settings for the user's electrical appliances 102-104 whenever the user logs into the appropriate account. Alternatively, the user can make such entries for a particular type of the electrical appliances 102-104 (e.g. entering default settings by a manufacturer or seller of the electrical appliances 102-104) or for groups of electrical appliances 102-104. Many of the rules for handling communications to or from the electrical appliances 102-104 may thus be set through the management console 113. Additionally, in some embodiments, before a new electrical appliance 102-104 is introduced to the marketplace, a designer or manufacturer of the new electrical appliance 102-104 may use the management console 113 to configure the server 101 (if necessary) to be able to properly handle communications to or from the new electrical appliance 102-104. Furthermore, in some embodiments, the management console 113 may be an available means (or the only means) by which a user can initially configure (e.g. set up initial rules for communicating with the cloud-based applications 105-109) a newly purchased and installed electrical appliance 102-104 before the first time the user attempts to access the new electrical appliance 102-104 through any of the cloud-based applications 105-109.

Figure 2:
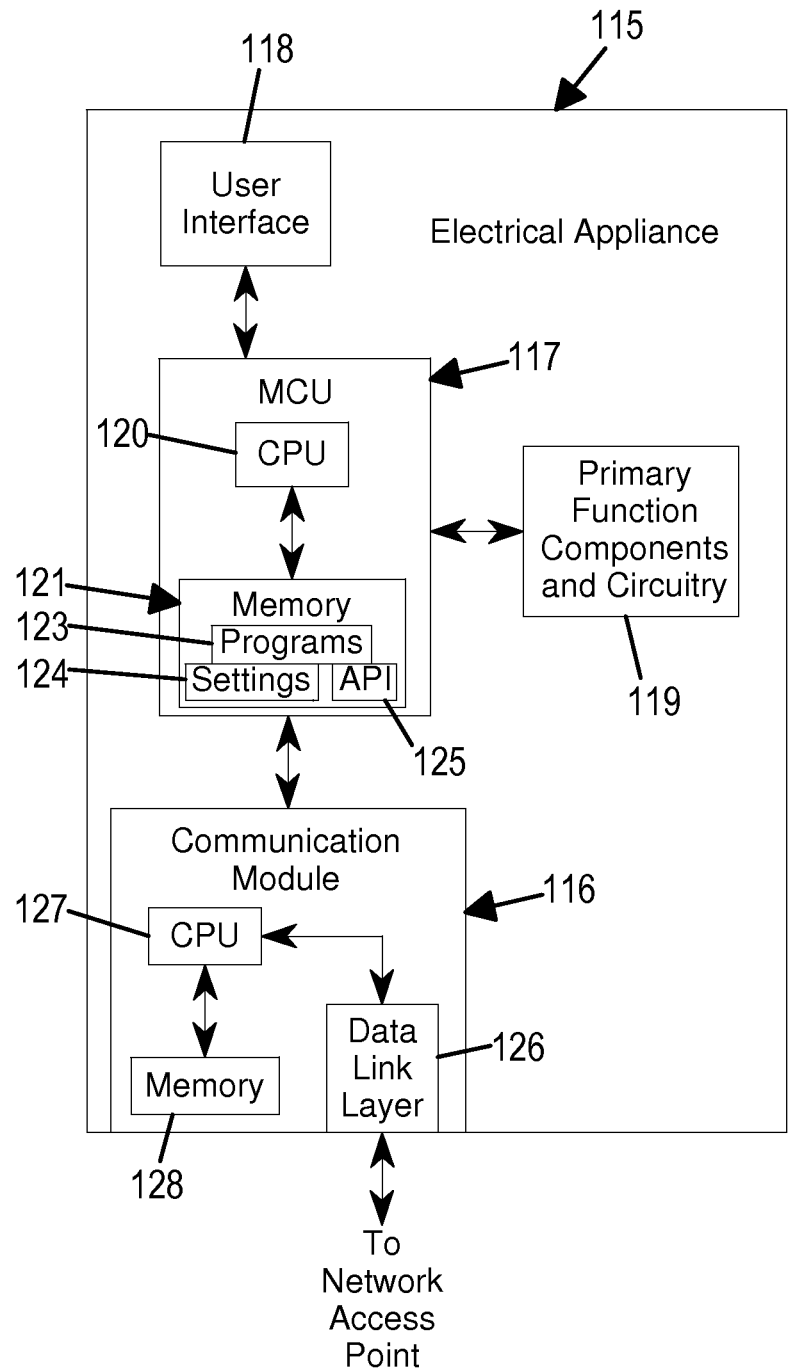
FIG. 2 is a simplified schematic diagram of an example electrical appliance for use in the communication system shown in FIG. 1, according to an embodiment of the present invention.

An example electrical appliance 115, which may be any of the aforementioned electrical appliances 102-104, incorporating an embodiment of the present invention, is shown in FIG. 2. The electrical appliance 115 generally includes a communication module 116, a microcontroller unit (MCU) 117, a user interface 118 and various primary function components and circuitry 119. These particular components 116-119 (and those introduced below) of the electrical appliance 115 are shown for illustrative purposes only and are not intended to limit the scope of the present invention. Other types or combinations or configurations of components may also be used. Additionally, the illustrated components 116-119 may each represent one or more other more specific components, not shown for simplicity. Furthermore, some of the illustrated components 116-119 (or subcomponents thereof) may be combined into a single component or integrated circuit (IC) as appropriate.

The communication module 116, the user interface 118 and the various primary function components and circuitry 119 are preferably connected to the MCU 117 in any appropriate manner, such as by point-to-point connections or via a common bus. The communication module 116, for example, preferably connects to the MCU 117 via a separate dedicated bus (e.g. SPI or UART). However, it is understood that the present invention is not so limited. Rather, other forms of interconnection may be used.

The various primary function components and circuitry 119 generally perform the primary functions of the electrical appliance 115, such as the customary functions of a thermostat, an oven, a TV program recorder, etc. Among other functions, the MCU 117 generally controls the various primary function components and circuitry 119, e.g. turns on an air conditioner unit, sets a temperature of an oven, starts recording a TV program on a desired channel, etc. Among other functions, the user interface 118 presents a set of displays, buttons, switches, knobs, etc. that a user can use to set the manner in which the main processor unit 117 controls the various primary function components and circuitry 119.

According to the illustrated embodiment, the MCU 117 generally includes a CPU (central processing unit) 120 and a memory 121, among other possible components not shown. These particular components 120 and 121 are shown for illustrative purposes only and are not intended to limit the scope of the present invention. Other types or combinations or configurations of components may also be used. Additionally, the illustrated components 120 and 121 may each represent one or more other more specific components, not shown for simplicity. Furthermore, some of the illustrated components 120 and 121 (or subcomponents thereof) may be combined into a single component or IC as appropriate. The memory 121, for example, may represent any appropriate combination of one or more RAM, ROM, flash memory, hard drive and/or any other type of persistent storage or dynamic memory components.

Among other functions, the CPU 120 generally performs the functions of the MCU 117 (e.g. controls the various primary function components and circuitry 119) according to programs 123 and settings 124 stored in the memory 121. Additionally, the CPU 120 preferably stores status data generated from the various primary function components and circuitry 119 in the memory 121 for later transmission to the server 101 (and from there to the cloud-based applications 105-109 and ultimately to the electronic devices 110-112).

The memory 121 also preferably contains an API (application programming interface) 125 that includes drivers that the CPU 120 uses to control the communication module 116. Under instructions from the API 125, the CPU 120 assembles data to be sent to the server 101 in periodic status updates or in response to requests from the server 101 or under any other appropriate situations. The communication module 116 receives this data and generates the communications in the appropriate protocol and transmits the communications through an available wired or wireless network access point (such as an Ethernet port, an IEEE 802.11 transceiver, etc.) to the cloud 114 and thus to the server 101. The communication module 116 also receives the communications from the server 101 through the network access point and passes the received communications to the CPU 120 and/or the memory 121 in the MCU 117. Under instructions from the API 125, the CPU 120 uses data or commands in the received communications to control the various primary function components and circuitry 119, configure the settings 124 or upgrade the programs 123 or the API 125.

In some embodiments, the data to be sent to the server 101 may also represent instructions or selections provided through the user interface 118 (by a user) for settings or changes to the rules that the server 101 uses to determine how to respond to communications between the electrical appliance 115 and the cloud-based applications 105-109. In some embodiments, the user is not explicitly made aware that the instructions or selections are being passed to the server 101 without being stored in the electrical appliance 115. The user may, thus, get the impression that the electrical appliance 115 has complexity or is capable of functions that it does not actually have. In other words, the offloading of functions or complexity to the server 101 may be transparent to or hidden from the user.

In some embodiments, the communication module 116 generally includes a data link layer 126, a CPU 127 and a memory 128, among other possible components. These particular components 126-128 are shown for illustrative purposes only and are not intended to limit the scope of the present invention. Other types or combinations or configurations of components may also be used. Additionally, the illustrated components 126-128 may each represent one or more other more specific components, not shown for simplicity. Furthermore, some of the illustrated components 126-128 (or subcomponents thereof) may be combined into a single component or IC as appropriate.

The data link layer 126 preferably includes an appropriate MAC (Media Access Controller) for communicating (wired or wireless) with the network access point. The memory 128 generally contains programs and data that the CPU 127 uses to control the functions of the communication module 116, e.g. generating the outgoing communications in the appropriate protocol, transmitting outgoing and receiving incoming communications and parsing (to whatever extent is appropriate in the communication module 116) the incoming messages. Additionally, since the existence of the server 101 is known prior to manufacturing the electrical appliance 115, the communication address for the server 101 can preferably be preloaded into the memory 128 (alternatively in the memory 121), so the electrical appliance 115 is fully capable of immediately contacting the server 101 as soon as the electrical appliance 115 is connected to the network access point and turned on. Furthermore, the memory 128 is preferably preloaded with a unique ID number or key code that identifies the electrical appliance 115 and which is included in any communication to the server 101, so the server 101 can look up the correct rules upon receiving the communications from the electrical appliance 115.

In alternative embodiments in which the communication module 116 is more deeply integrated with other components of the electrical appliance 115 than is suggested by FIG. 2, the MCU 117 may perform the functions of the CPU 127, and the memory 121 may perform the functions of the memory 128. In a preferred embodiment, however, the configuration of the communication module 116 (as illustrated and described) enables a designer or manufacturer of a prior art non-network-capable electrical appliance to perform a relatively simple and easy redesign that merely adds the communication module 116 (potentially just a single IC chip) and the API 125 to the existing electrical appliance, along with some relatively minor modifications to the programs 123. In this manner (in addition to the fact that much of the apparent complexity of the electrical appliance 115 actually resides in the server 101), the development time and costs for bringing the electrical appliance 115 to market can be minimized or reduced when compared to that for a prior art feature-rich electrical appliance.

Figure 3:
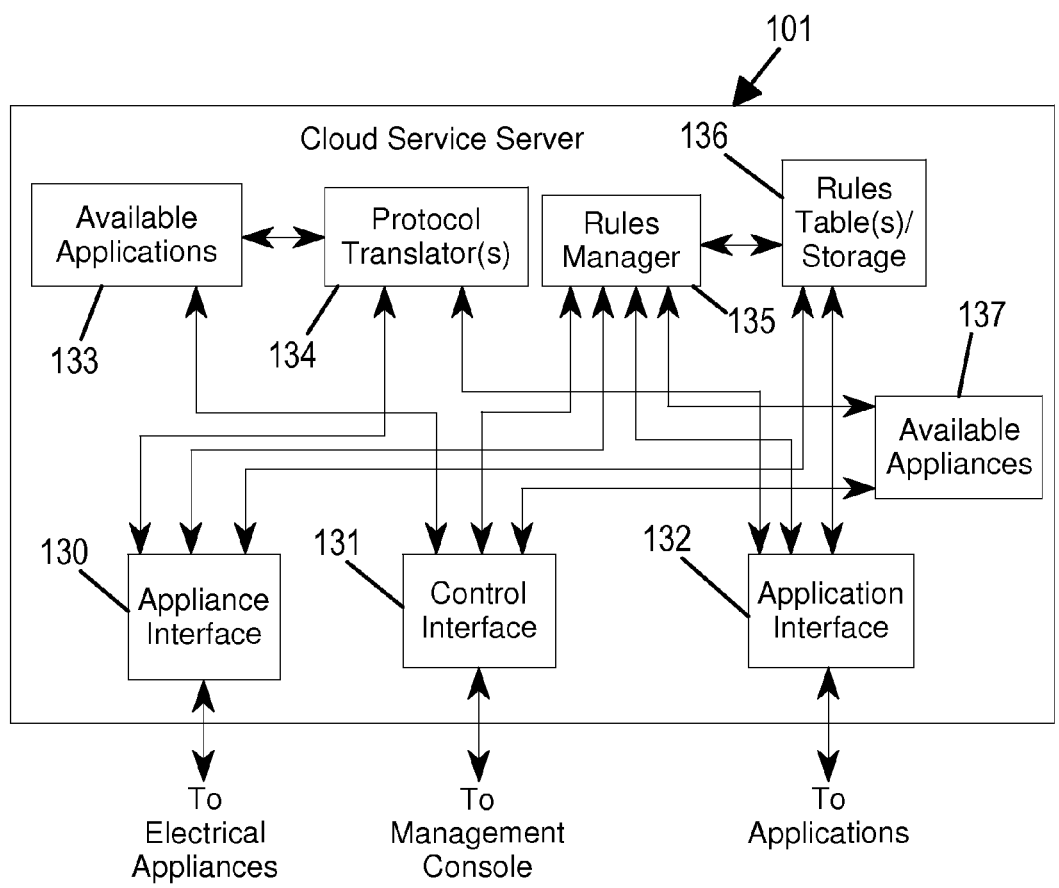
FIG. 3 is a simplified functional diagram of an example cloud service server for use in the communication system shown in FIG. 1, according to an embodiment of the present invention.

A simplified example functional diagram of the server 101, incorporating an embodiment of the present invention, is shown in FIG. 3. Functional components of the server 101 generally include an appliance interface 130, a control interface 131, an application interface 132, a description of available applications 133, one or more protocol translators 134, a rules manager 135, one or more rules tables or storage (the rules table) 136 and a description of available appliances 137. These particular functional components 130-137 of the server 101 are shown for illustrative purposes only and are not intended to limit the scope of the present invention. Other types or combinations or configurations of functional components may also be used. Additionally, the illustrated functional components 130-137 may each represent one or more other more specific hardware or software components, not shown for simplicity. Furthermore, some of the illustrated functional components 130-137 (or subcomponents thereof) may be combined into a single component as appropriate.

The appliance interface 130 generally represents components and programs that connect to the cloud 114 to transmit and receive the communications to and from the electrical appliances 102-104 and 115 and that handle the incoming communications from the electrical appliances 102-104 and 115 and generate the outgoing communications to the electrical appliances 102-104 and 115. The application interface 132 generally represents components and programs that connect to the cloud 114 to transmit and receive the communications to and from the cloud-based applications 105-109 and that handle the incoming communications from the cloud-based applications 105-109 and generate the outgoing communications to the cloud-based applications 105-109. The control interface 131 generally represents components and programs that connect to the management console 113 (optionally through the cloud 114) to transmit and receive the communications to and from the management console 113 and that handle the incoming communications from the management console 113 and generate the outgoing communications to the management console 113. The protocol translators 134 generally represents components and programs used to offload various compute or memory intensive tasks from the electrical appliances 102-104 and 115, to implement any protocols required to communicate with the cloud-based applications 105-109 and to translate communications between the protocol(s) used by the electrical appliances 102-104 and 115 and the protocols used by the cloud-based applications 105-109. The description of available applications 133 generally includes data and programs used by the protocol translators 134 to translate the communications between protocols. The rules table 136 generally contains the rules used by the appliance interface 130 and the application interface 132 to determine how to handle or respond to the communications from the electrical appliances 102-104 and 115 and the cloud-based applications 105-109, respectively. The rules manager 135 generally represents components and programs that update the rules table 136 when new rules settings are received through any of the interfaces 130-132. The description of available appliances 137 generally includes data (e.g. lists of operating parameters or lists of allowable cloud-based applications 105-109 that may be used for designated types of the electrical appliances 102-104 and 115) used by the rules manager 135 to determine allowable rules in the rules table 136 for the electrical appliances 102-104 and 115.

When a user accesses the management console 113 to manage rules or settings for a previously registered electrical appliance 102-104 or 115, the management console 113 retrieves any current rules through the control interface 131 from the rules table 136. The user preferably has to login or identify desired electrical appliance 102-104 or 115 in a Web form, so the management console 113 can look up the correct electrical appliance 102-104 or 115 in the rules table 136. If the user identifies an electrical appliance 102-104 or 115 for which there is no entry in the rules table 136, then the management console 113 may so inform the user and present a blank Web form for the user to register or enter initial information (such as a type designation) for the new electrical appliance 102-104 or 115 in anticipation of the electrical appliance 102-104 or 115 eventually being activated and contacting the server 101. (After receiving the type designation, the management console 113 can generate a blank Web form specifically for that type of electrical appliance 102-104 or 115 as determined by allowable rules for the type of electrical appliance 102-104 or 115 retrieved from the description of available appliances 137.) Alternatively, the management console 113 may refuse to accept any information for an electrical appliance 102-104 or 115 for which there is no entry in the rules table 136. (This alternative may prevent hackers from trying to flood the rules table 136 with bogus entries, perhaps in anticipation of trying to take control of another person's electrical appliance 102-104 or 115 as soon as it is activated and contacts the server 101.) If there is an entry in the rules table 136 for the desired electrical appliance 102-104 or 115 (and the user has passed any security measures), then the user may be presented with a Web form showing the current rules. If the user then makes changes to any of the rules, then the management console 113 preferably transmits the changes through the control interface 131 to the rules manager 135. The rules manager 135 then updates the rules table 136 with the desired changes (possibly after confirming that the requested changes are allowable, e.g. within a given range for certain parameters, as indicated by the description of available appliances 137).

A user (e.g. an employee of a designer or manufacturer of one of the electrical appliances 102-104 and 115) may access the management console 113 to manage the description of available appliances 137. For example, the data for a type of electrical appliance 102-104 or 115 already in the description of available appliances 137 may have to be updated or upgraded. Also, data for a new type of electrical appliance 102-104 or 115 may have to be added to the description of available appliances 137.

A user may also access the management console 113 to manage the description of available applications 133. For example, the data and programs used by the protocol translators 134 to translate the communications involving protocols for a cloud-based application 105-109 already in the description of available applications 133 may have to be updated or upgraded. Also, data and programs for the protocol translators 134 to translate the communications involving new protocols for a new cloud-based application 105-109 may have to be added to the description of available applications 133.

Figure 4:
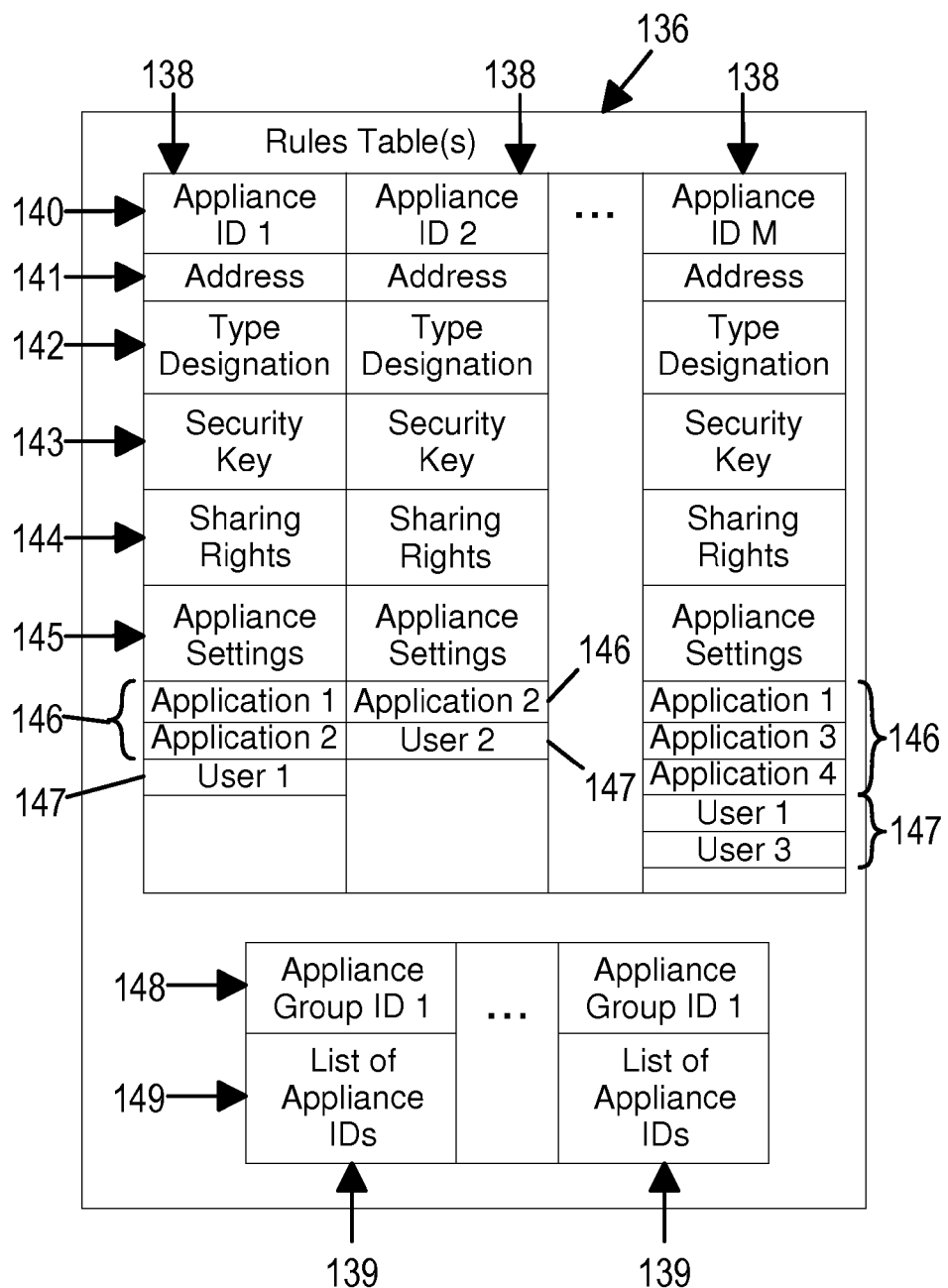
FIG. 4 is a simplified diagram of a storage table or set of storage tables containing rules, settings or configuration data for use in the cloud service server shown in FIG. 3, according to an embodiment of the present invention.

A simplified diagram of example entries in an example rules table 136 is shown in FIG. 4, according to an embodiment of the present invention. The rules table 136 generally shows individual appliance entries 138 and an appliance group entry 139 with a variety of fields in each. It is understood that these types of rules table entries 138 and 139 and fields are for illustrative purposes only and not intended to limit the scope of the present invention. Other types or combinations of rules table entries and fields may depend on the types of electrical appliances 102-104 and 115 and/or the desires of appliance manufacturers or designers. Additionally, the rules table 136 may represent multiple databases, each containing different sets of information, but which are combined herein for simplicity of description.

Each individual appliance entry 138 represents a different corresponding individual electrical appliance 102-104 or 115. Each electrical appliance 102-104 or 115 is preferably identified by a unique ID number or key code (described above) in an appliance ID number field 140 in each corresponding individual appliance entry 138. Each entry 138 preferably has an address field 141 that contains a communication address, with which the server 101 can properly address communications intended for the corresponding individual electrical appliance 102-104 or 115. Each entry 138 also preferably has a type designation field 142 that contains data that identifies the type of the corresponding individual electrical appliance 102-104 or 115, which can be used, for example, to look up the allowable rules for the type of the electrical appliance 102-104 or 115, as indicated in the description of available appliances 137. Each entry 138 also preferably has a security key field 143 that contains a security key code or password set by the corresponding individual electrical appliance 102-104 or 115 or the manufacturer or user thereof to prevent unauthorized access to the electrical appliance 102-104 or 115. Each entry 138 also preferably has a sharing rights field 144 that contains a code that indicates who (e.g. only the user, the user and specified friends, the entire public, etc.) can access the corresponding individual electrical appliance 102-104 or 115 to view the status or settings and/or to change the settings thereof. Each entry 138 also preferably has an appliance settings field 145 that contains data that indicates the operational settings for the corresponding individual electrical appliance 102-104 or 115, e.g. thermostat heating and cooling thresholds, oven baking temperature, water sprinkler duration, etc. Each entry 138 also preferably has one or more application fields 146 containing data indicating which of the cloud-based applications 105-109 can communicate with the corresponding individual electrical appliance 102-104 or 115. Each entry 138 also preferably has one or more user fields 147 containing data identifying the user(s) of the corresponding individual electrical appliance 102-104 or 115.

Each appliance group entry 139 represents a different corresponding group of electrical appliances 102-104 and 115 that are preferably operated with some or all rules the same. Managing the electrical appliances 102-104 and 115 as a group, therefore, enables a user to make only a few settings in the rules table 136 through the management console 113 or the cloud-based applications 105-109 in order to quickly and efficiently affect a large number of the electrical appliances 102-104 and 115. Each appliance group entry 139 preferably has an appliance group ID field 148 that contains a unique ID number or key code that identifies the corresponding group of electrical appliances 102-104 and 115. Each appliance group entry 139 also preferably has a list of appliance IDs field 149 that contains the unique ID number or key code (described above) that identifies each individual electrical appliance 102-104 and 115 in the corresponding group of electrical appliances 102-104 and 115. Other fields (not shown) in each appliance group entry 139 may include some or all of the same fields 140-147 described above. Alternatively, the unique ID numbers or key codes contained in the list of appliance IDs field 149 may point to an entry 138 for each individual electrical appliance 102-104 and 115 in the corresponding group of electrical appliances 102-104 and 115.

This alternative may result in considerable duplication or redundancy in data, but enables the ability to set some of the rules different for selected ones of the individual electrical appliances 102-104 and 115 in the corresponding group of electrical appliances 102-104 and 115.

Figure 5:
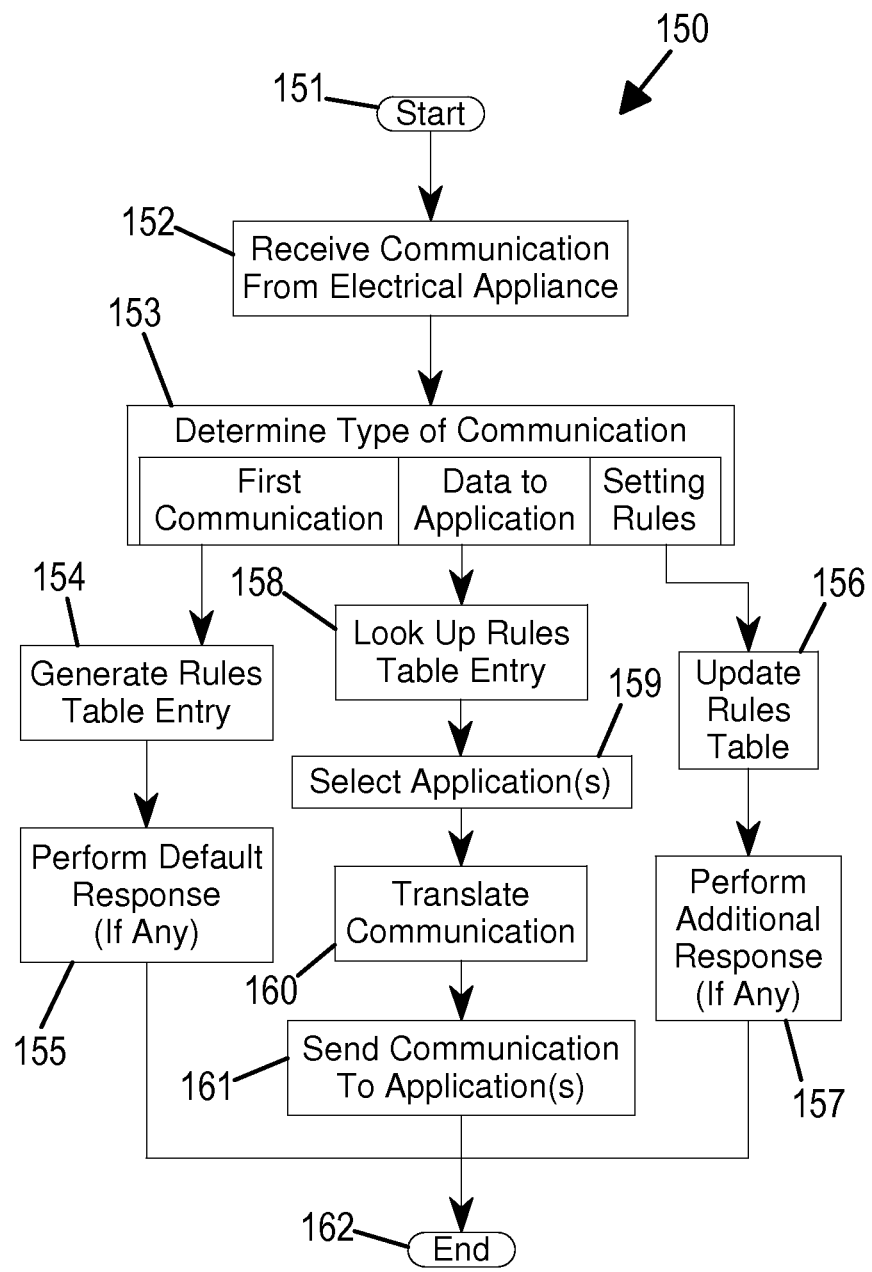
FIG. 5 is a simplified flowchart of a process, incorporating an embodiment of the present intention, for the cloud service server shown in FIG. 3 to handle a communication received from an electrical appliance.

A simplified flowchart of a process 150, incorporating an embodiment of the present intention, for the server 101 to handle a communication received from one of the electrical appliances 102-104 or 115 is shown in FIG. 5. It is understood that the specific steps (and the order thereof) in the process 150 are shown for illustrative purposes only and not intended to limit the scope of the present invention. Other types, combinations, performers or orders of steps are possible.

According to this embodiment, the process 150 starts (at 151) upon identifying a communication as having come from one of the electrical appliances 102-104 or 115 and routing the communication to the appliance interface 130. After the appliance interface 130 receives (at 152) the communication, the appliance interface 130 determines (at 153) the type of the communication. For example, the communication may be the first communication from the electrical appliance 102-104 or 115, the communication may be a request to set one or more of the rules in the rules table 136 or the communication may contain data that is destined for one of the cloud-based applications 105-109.

To be the first communication from the electrical appliance 102-104 or 115, as determined at 153, the communication may specifically identify itself as coming from a new electrical appliance 102-104 or 115 or the appliance interface 130 may unsuccessfully attempt to look up the electrical appliance 102-104 or 115 in the rules table 136. In either case, the appliance interface 130 may respond (if allowed) by causing (at 154) an entry 138 to be generated in the rules table 136 for the electrical appliance 102-104 or 115. Additionally, the appliance interface 130 may perform (at 155) any appropriate initial default response, such as sending to the electrical appliance 102-104 or 115 any outstanding upgrades for the API 125 or the programs 123.

If the communication is a request to set one or more of the rules in the rules table 136, as determined at 153, then the appliance interface 130 preferably instructs the rules manager 135 to update (at 156) the rules table 136 accordingly. The appliance interface 130 may then perform (at 157) any additional response. For example, the rules table 136 may have a field in the entry 138 for this electrical appliance 102-104 or 115 that requires the application interface 132 to send a communication to a designated cloud-based application 105-109 alerting the user of the rules update.

If the communication contains data that is destined for one of the cloud-based applications 105-109, as determined at 153, then the appliance interface 130 preferably looks up (at 158) the corresponding entry 138 in the rules table 136 and selects (at 159) the cloud-based application(s) 105-109 indicated in the application field(s) 146. The appliance interface 130 then preferably causes the protocol translator(s) 134 to translate (at 160) the communication from the protocol used by the electrical appliance 102-104 or 115 into the protocol(s) used by the selected cloud-based application(s) 105-109. The appliance interface 130 then preferably causes the application interface 132 to send (at 161) the translated communication(s) to the selected cloud-based application(s) 105-109. After 155, 157 or 161, the process 150 preferably ends (at 162) or enters a waiting mode to wait for the next communication from one of the electrical appliances 102-104 or 115.

Figure 6:
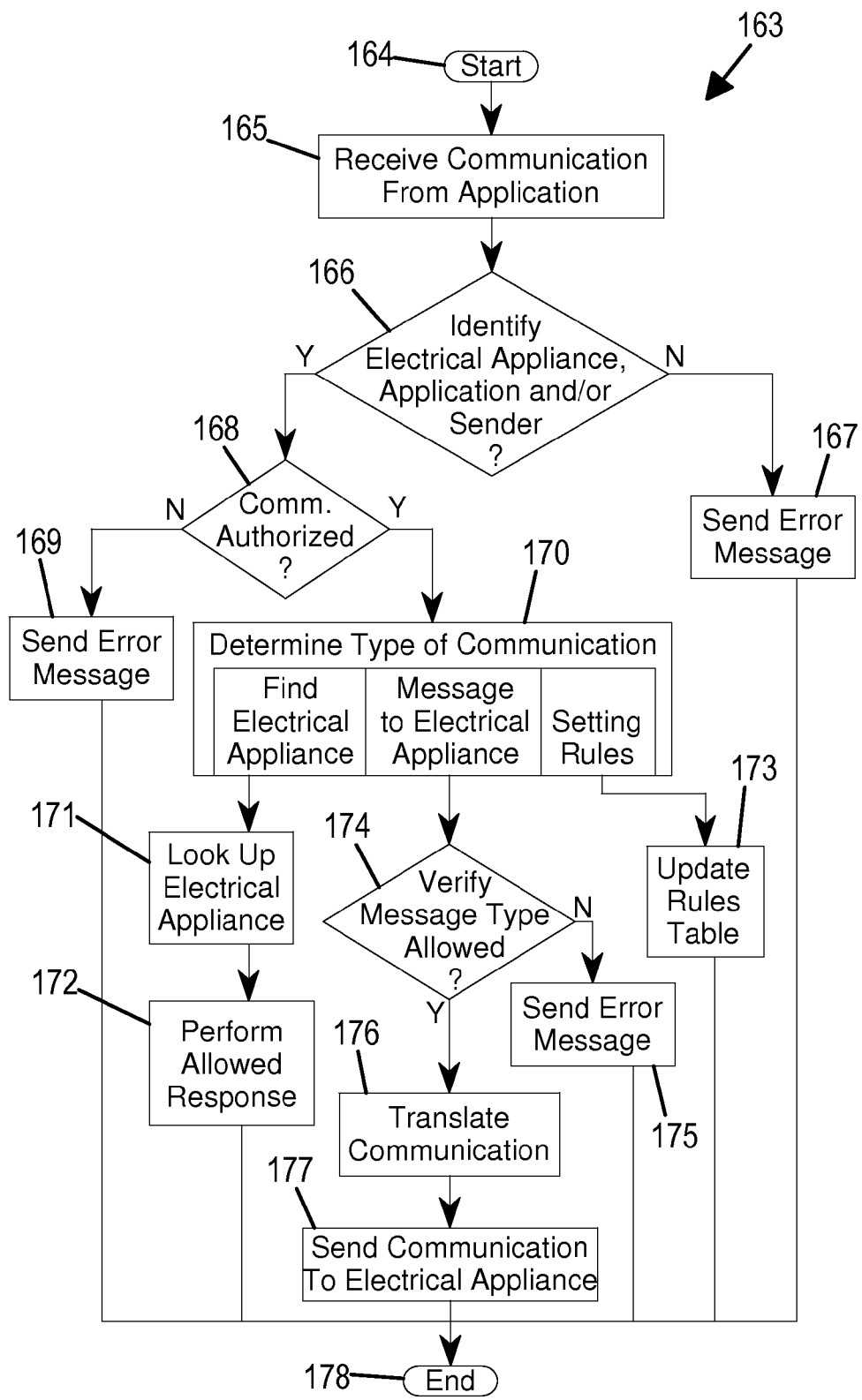
FIG. 6 is a simplified flowchart of a process, incorporating an embodiment of the present intention, for the cloud service server shown in FIG. 3 to handle a communication received from an application.

A simplified flowchart of a process 163, incorporating an embodiment of the present intention, for the server 101 to handle a communication received from one of the cloud-based applications 105-109 is shown in FIG. 6. It is understood that the specific steps (and the order thereof) in the process 163 are shown for illustrative purposes only and not intended to limit the scope of the present invention. Other types, combinations, performers or orders of steps are possible.

According to this embodiment, the process 163 starts (at 164) upon identifying a communication as having come from one of the cloud-based applications 105-109 and routing the communication to the application interface 132. After the application interface 132 receives (at 165) the communication, the application interface 132 determines (at 166) whether it can identify (e.g. by a look up in the rules table 136) the target electrical appliance 102-104 or 115, the sending cloud-based application 105-109 and/or the sender (e.g. the electronic device 110-112) of the communication. If not, then the application interface 132 preferably sends (at 167) an error message back to the sender, e.g. indicating that the target electrical appliance 102-104 or 115 cannot be found or that the sending cloud-based application 105-109 is not supported or that the sender is not a registered user of the communication system 100.

If the determination at 166 is positive, then the application interface 132 preferably further determines (at 168) whether the sending cloud-based application 105-109 and the sender are authorized to communicate with the target electrical appliance 102-104 or 115. If not, then the application interface 132 preferably sends (at 169) an appropriate error message back to the sender indicating the lack of authorization. However, if the determination at 168 is positive, then the application interface 132 preferably further determines (at 170) the type of the communication. For example, the communication may simply be to find out whether the target electrical appliance 102-104 or 115 has established a connection to the server 101, the communication may be a request to set one or more of the rules in the rules table 136 or the communication may contain data or instructions that is destined for one of the electrical appliances 102-104 or 115.

If the communication is simply to find the target electrical appliance 102-104 or 115, as determined at 170, then the application interface 132 preferably performs (at 171) a look up in the rules table 136 to find if there is an entry 138 for the target electrical appliance 102-104 or 115. The application interface 132 then performs (at 172) whatever response is allowed in this case. For example, if the sender is the user or has sharing rights, then the application interface 132 may send a response communication back to the sender indicating that the target electrical appliance 102-104 or 115 has been found and supplying any allowable or available details about the status of the target electrical appliance 102-104 or 115. On the other hand, if the entry 138 for the target electrical appliance 102-104 or 115 does not indicate any users, then the application interface 132 can treat the current communication as a rightful attempt to establish user authority over the target electrical appliance 102-104 or 115, though the application interface 132 may require entry of a security code before establishing user authority.

If the communication is a request to set one or more of the rules in the rules table 136, as determined at 170, then the application interface 132 preferably instructs the rules manager 135 to update (at 173) the rules table 136 accordingly. Confirmation of the update may also be returned to the sender.

If the communication contains data that is destined for the target electrical appliance 102-104 or 115, as determined at 170, then the application interface 132 preferably verifies (at 174) whether the type of message that is desired to be sent to the target electrical appliance 102-104 or 115 is allowed. If not, then an appropriate error message is preferably sent (at 175) back to the sender. However, if the verification at 174 is positive, then the application interface 132 preferably causes the protocol translator 134 to translate (at 176) the communication into the protocol used by the target electrical appliance 102-104 or 115. Then the application interface 132 sends (at 177) the translated communication to the target electrical appliance 102-104 or 115. After 167, 169, 172, 173, 175 or 177, the process 163 preferably ends (at 178) or enters a waiting mode to wait for the next communication from one of the cloud-based application 105-109.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. A method comprising:
receiving by a server a communication from an electrical appliance, the electrical appliance being one of a plurality of electrical appliances, the communication being in a protocol that is for communicating between the server and the plurality of electrical appliances, the plurality of electrical appliances being embedded devices having primary function components for performing dedicated primary functions other than networking and computing functions;
selecting by the server from a plurality of cloud-based applications a target cloud-based application that can service the electrical appliance;
translating by the server the communication into a protocol that is for communicating with the target cloud-based application selected to service the electrical appliance; and
transmitting by the server the translated communication to the target cloud-based application.

2. The method of claim 1, wherein:
the plurality of electrical appliances are capable of communicating application data only in the protocol that is for communicating between the server and the plurality of electrical appliances; and
the server enables communicating between the plurality of electrical appliances and the plurality of cloud-based applications.

3. The method of claim 1, further comprising:
receiving by the server a second communication, the second communication coming from the target cloud-based application;
translating by the server the second communication into the protocol that is for communicating between the server and the plurality of electrical appliances; and
transmitting by the server the translated second communication to the electrical appliance.

4. The method of claim 3, further comprising:
determining by the server whether the target cloud-based application is authorized to communicate with the electrical appliance;
determining by the server a type of the second communication; and
determining by the server whether the electrical appliance can accept communications of the type of the second communication.

5. The method of claim 3, wherein:
a user of the electrical appliance can use a device capable of accessing the plurality of cloud-based applications in order to transmit the communication from the target cloud-based application to the server.

6. The method of claim 1, further comprising:
receiving by the server one or more commands that establish one or more rules by which the server determines how to respond to communications from the plurality of electrical appliances and the plurality of cloud-based applications; and
setting by the server the one or more rules according to the received one or more commands.

7. The method of claim 6, wherein:
the server receives at least one of the one or more commands from at least one of the plurality of cloud-based applications, with which a user can make a selection for remotely setting at least one of the rules.

8. The method of claim 6, wherein:
the server receives at least one of the one or more commands from the electrical appliance, which has an interface with which a user can make a selection for remotely setting at least one of the rules.

9. The method of claim 1, further comprising:
prior to the receiving by a server a communication from an electrical appliance, receiving by the server an initial identification communication including identification data that identifies at least one of the electrical appliance, a type of the electrical appliance and a network address of the electrical appliance;
registering by the server the identification data;
receiving by the server an initial access communication from the target cloud-based application including data identifying the electrical appliance; and
setting by the server a rule that allows the target cloud-based application to service the electrical appliance.

10. The method of claim 1, further comprising:
adding an additional cloud-based application to the plurality of cloud-based applications, the additional cloud-based application being selectable as the target cloud-based application that can service the electrical appliance without updating the electrical appliance.

11. A server comprising:
an electrical appliance interface that sends and receives communications to and from a plurality of electrical appliances, the communications between the server and the electrical appliances being in an appliance communication protocol, the plurality of electrical appliances being embedded devices having primary function components for performing dedicated primary functions other than networking and computing functions;
an application interface that sends and receives communications to and from a plurality of cloud-based applications, the communications between the server and the cloud-based applications being in a plurality of application communication protocols;
a rules storage component that stores rules that determine, for each electrical appliance, which of the cloud-based applications services that electrical appliance; and
a protocol translator that translates communications between the appliance communication protocol and the application communication protocols;

and wherein:

when the electrical appliance interface receives a communication from one of the electrical appliances, the server uses the rules storage component to select one or more of the cloud-based applications, the protocol translator translates the received communication into one or more translated communications, and the application interface transmits the one or more translated communications to the selected one or more cloud-based applications.

12. The server of claim 1, wherein:

the plurality of electrical appliances are capable of communicating application data only in the appliance communication protocol; and the server enables communicating between the plurality of electrical appliances and the plurality of cloud-based applications.

13. The server of claim 1, wherein:

when the application interface receives a second communication being sent in one of the application communication protocols from one of the cloud-based applications and identifying one of the electrical appliances as a recipient electrical appliance, the server uses the rules storage component to determine whether the sending cloud-based application is authorized to communicate with the recipient electrical appliance; and if the sending cloud-based application is authorized to communicate with the recipient electrical appliance, the protocol translator translates the second received communication into a second translated communication in the appliance communication protocol, and the electrical appliance interface transmits the second translated communication to the recipient electrical appliance.

14. The server of claim 13, wherein:

due to functionality enabled by the server remote from the electrical appliances, an impression is presented to a user of accessing the recipient electrical appliance directly through the sending cloud-based application and of the recipient electrical appliance having a level of complexity of functionality greater than is built into the recipient electrical appliance.

15. The server of claim 1, wherein:

due to functionality enabled by the server remote from the electrical appliances, the electrical appliances are accessible through electronic devices that can communicate in the application communication protocols through the cloud-based applications and then to the server, which translates communications that originate from the electronic devices into the appliance communication protocol for transmission to the electrical appliances.

16. The server of claim 1, wherein:

when the electrical appliance interface receives a communication from one of the electrical appliances for which there is no entry in the rules storage component, the server generates an entry for the electrical appliance in the rules storage component, the entry includes identification data that identifies at least one of the electrical appliance, a type of the electrical appliance and a network address of the electrical appliance.

17. The server of claim 1, further comprising:

a control interface that receives communications from a Web-based management console application, through which entries are generated and updated in the rules storage component and available cloud-based applications are established.

18. An electrical appliance comprising:

a control unit that manages primary functions of the electrical appliance, the primary functions being dedicated functions other than networking and computing functions; and a communication module connected to the control unit, the communication module sending and receiving communications to and from a server;

and wherein:

the control unit generates data for the communications that the communication module sends to the server;

the control unit controls the primary functions of the electrical appliance in response to data in the communications that the communication module receives from the server;

a single communication protocol is used for communications between the communication module and the server that involve cloud-based applications;

the server enables the communication module to communicate with the cloud-based applications;

the cloud-based applications require the use of other communication protocols; and the server translates the communications between the single communication protocol and the other communication protocols whenever the communications are passed between the communication module and the cloud-based applications.

19. The electrical appliance of claim 18, wherein:

the electrical appliance is accessible through an electronic device that can communicate in at least some of the other communication protocols through the corresponding cloud-based applications and then to the server, which translates communications that originate from the electronic device into the single communication protocol for transmission to the electrical appliance.

20. The electrical appliance of claim 19, wherein:

due to functionality of the electronic device in conjunction with functionality enabled by the server remote from the electrical appliance, the electronic device presents an appearance of communicating directly with the electrical appliance through at least one of the cloud-based applications.

21. The electrical appliance of claim 18, further comprising:

a user interface that a user can operate to set functional parameters for the electrical appliance, at least some of the functional parameters are set remote from the electrical appliance within the server after being communicated by the communication module to the server.

* * * * *